No. 618,056.  
J. A. CRAINE.  
FAN MOTOR.  
(Application filed Dec. 18, 1897.)  
(No Model.)  
Patented Jan. 24, 1899.
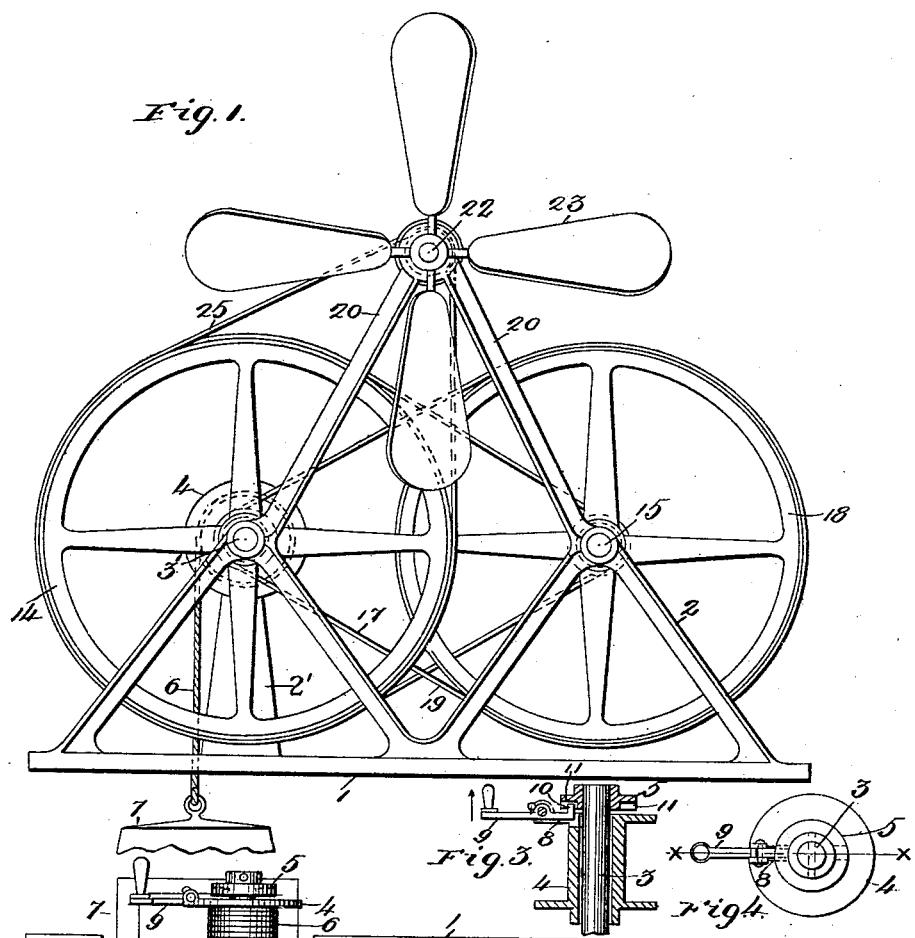
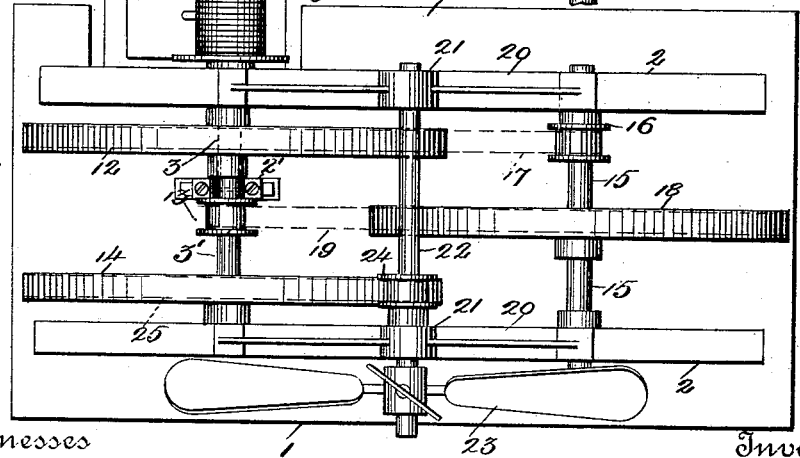
Witnesses  
Alfred A. Markey  
E. Elliott
Inventor  
James A. Craine  
By his Attorneys

UNITED STATES PATENT OFFICE.

JAMES A. CRAINE, OF MURPHYSBOROUGH, ILLINOIS.

FAN-MOTOR.

SPECIFICATION forming part of Letters Patent No. 618,056, dated January 24, 1899.

Application filed December 13, 1897. Serial No. 661,716. (No model.)

*To all whom it may concern:*

Be it known that I, JAMES A. CRAINE, a citizen of the United States, residing at Murphysborough, in the county of Jackson and State of Illinois, have invented certain new and useful Improvements in Fan-Motors, of which the following is a full, clear, and exact description, reference being had to the accompanying drawings, forming a part hereof.

My invention has relation to improvements in fan-motors; and it consists in the novel arrangement and combination of parts, more fully set forth in the specification and pointed out in the claims.

In the drawings, Figure 1 is a front elevation of my complete invention. Fig. 2 is a top plan view of the same with the belts removed. Fig. 3 is a longitudinal section of the winding-spool, taken on the line $x\,x$ of Fig. 4; and Fig. 4 is an end view of the winding-spool and shaft for the same.

The object of my invention is to construct a simplified fan-motor which will run a suitable length of time when the weight is once wound up and without furthur attention, thereby dispensing with expensive motor power, such as electric motors and the like; and it consists of a suitable frame within which is mounted a fan-shaft, to which the fan is attached, a series of belt-pulleys and belt-wheels, over which endless belts are passed, shafts for said pulleys and wheels, and a winding device, the construction of which will be hereinafter described, the whole adapted to be inclosed within a suitable case with the exception of the fan for covering the operating parts.

Referring to the drawings, 1 represents a base, upon which are supported two frames 2 2, forming supporting-bearings for the several shafts employed in carrying out my invention. The short main power-shaft 3 is journaled in one of the opposite supporting-frames 2 and a bearing 2′, one end of which projects a suitable distance beyond one of said frames, and passed loosely over said projecting end of the shaft is a winding-spool 4, the latter being prevented from passing off said shaft by a collar 5, securely fixed to the shaft. Upon this spool is wound a cord 6, one end of which is attached to the spool, and to the opposite end is suspended a weight 7, whereby the power-shaft 3 is driven in one direction when the spool 4 is locked to the collar 5, and consequently the shaft, in a manner hereinafter fully described, for propelling the machine.

One side of the spool 4 is provided with a slot 8, within which is pivoted a lever 9, the long arm of which operates as a crank for turning the spool in winding up the weight. The short arm of the lever 9 is provided with an upturned end 10, which is adapted to enter either one of the depressions 11, formed on the inner flat surface of the collar or that surface next to the spool, whereby when the end 10 is located in one of the depressions 11 the shaft 3 and spool 4 will be locked against rotation independent of one another, in which instance the weight 7 will operate to turn the shaft 3. After the cord 6 is entirely unwound from the spool the lever 9 is pulled slightly in the direction as shown by the arrow, Fig. 4, disengaging the spool from the collar, the upturned end of the lever passing out of the depression 11, whereby the spool is free to be turned on the shaft 3, and by turning the lever 9, and consequently the spool, the cord 6 will be wound upon the latter, and after being so wound the upturned end is again forced into one of the depressions 11, and the spool is therefore locked to the shaft.

Fixed to the short power-shaft 3 is a belt-wheel 12, and arranged on a line with said shaft and journaled in the opposite side 2 of the frame is a similar shaft 3′, to which is keyed or otherwise secured, adjacent to the bearing 2′, a belt-pulley 13. It will thus be seen that the shafts 3 and 3′ are rotatable independently of each other, as clearly shown by the dotted lines, Fig. 2, where the said shafts come together and are journaled in the bearing 2.

14 represents a belt-wheel, also fixed to the shaft 3 and similar to the belt-wheel 12.

15 represents a shaft, which is also journaled in the opposite side frames 2 2, and fixed to the same is a belt-pulley 16, an endless belt 17 passing over the latter and the belt-wheel 12. Also fixed to the shaft 15 is a belt-wheel 18, an endless belt 19 passing over the same and the belt-pulley 13. The upper extension 20 of the frames 2 2 are provided with bearings 21, which receive the opposite ends of the fan-shaft 22, to the projecting end of which is fixed a fan 23, of ordinary construction. To said shaft is also fixed a belt-pulley 24 in a line with the belt-wheel 14, an endless belt 25 passing over said pulley and belt-wheel. By this arrangement of belt-wheels and pulleys a suitable speed or rotation is imparted to the fan to produce a sufficient amount of wind, and yet the weight 7 will move downwardly very slowly.

The fan-motor above described may be used conveniently upon store-counters, tables, and the like or any elevated place to allow the weight to drop a suitable distance in order that the machine may run a desirable length of time. I do not limit myself to a weight, however, as a spring may be employed in its stead, the remaining parts of the machine being carried out in a like manner and without any material change should a spring be employed.

Having fully described my invention, what I claim is—

1. In a fan-motor, a suitable power-shaft, a spool loosely mounted upon the projecting end of the same, a collar fixed to said shaft adjacent to one end of the spool, there being depressions formed on the inner surface of the collar, a lever pivoted within a slot formed in one end of the spool having an upturned end forming a part of the short arm of the said lever, and adapted to coöperate with said depressions, a fan-shaft, suitable power-transmitting devices for imparting power to said fan-shaft, a cord adapted to be wound upon said spool, and a weight suspended by said cord, substantially as described.

2. A fan-motor comprising a suitable frame, shafts, belt-wheels, pulleys and belts, a power-shaft, a spool loosely mounted upon the projecting end of the same, a collar fixed to said shaft adjacent to one end of the spool there being depressions formed on the inner surface of the collar, a lever pivoted within a slot formed in one end of the spool having an upturned end forming a part of the short arm of the said lever, and adapted to coöperate with said depressions, a fan-shaft, suitable power-transmitting devices for imparting power to said fan-shaft, a cord adapted to be wound upon said spool, and a weight suspended by said cord, substantially as described.

In testimony whereof I affix my signature in presence of two witnesses.

JAMES A. CRAINE.

Witnesses:
E. A. DAVIS,
GEO. S. SHELTON.